United States Patent [19]

Hale et al.

[11] Patent Number: 5,361,841
[45] Date of Patent: Nov. 8, 1994

[54] DRILLING AND CEMENTING WITH BLAST FURNACE SLAG/POLYALCOHOL FLUID

[75] Inventors: Arthur H. Hale, Houston; Kenneth M. Cowan, Sugar Land, both of Tex.

[73] Assignee: Shell Oil Company, Houston, Tex.

[21] Appl. No.: 68,334

[22] Filed: May 27, 1993

[51] Int. Cl.$^5$ .............................................. E21B 33/14
[52] U.S. Cl. ................................... 166/293; 166/300; 175/65; 507/139; 507/140
[58] Field of Search ................. 166/293, 300; 175/64, 175/65; 507/140, 145, 136, 139

[56] References Cited

U.S. PATENT DOCUMENTS

| | | |
|---|---|---|
| 2,146,693 | 2/1939 | Vietti et al. ........................ 507/145 |
| 2,165,823 | 7/1939 | Vietti et al. ........................ 507/145 |
| 2,191,312 | 2/1940 | Cannon . |
| 2,205,609 | 6/1940 | Vail et al. ........................... 507/145 |
| 2,882,873 | 2/1958 | Harmsen et al. . |
| 3,499,491 | 7/1960 | Wyant et al. . |
| 3,557,876 | 4/1969 | Tragesser . |
| 3,640,343 | 2/1972 | Darley ............................ 507/145 X |
| 3,679,001 | 7/1972 | Hill ................................. 507/145 X |
| 3,746,109 | 7/1973 | Darley ............................ 507/145 X |
| 3,964,921 | 6/1976 | Persinski et al. . |
| 4,174,974 | 11/1979 | Fondriest . |
| 4,560,812 | 12/1985 | Blytas . |
| 4,664,843 | 5/1987 | Burba, III et al. . |
| 4,674,574 | 6/1987 | Savoly et al. . |
| 4,756,761 | 7/1988 | Philip et al. . |
| 4,780,220 | 10/1988 | Peterson . |
| 4,897,119 | 1/1990 | Clarke . |
| 5,007,489 | 4/1991 | Enright et al. . |
| 5,020,598 | 6/1991 | Cowan et al. . |
| 5,058,679 | 10/1991 | Hale et al. . |
| 5,073,197 | 12/1991 | Majumdar et al. . |
| 5,076,373 | 12/1991 | Hale et al. ....................... 175/65 X |
| 5,082,499 | 1/1992 | Shen . |
| 5,084,102 | 1/1992 | Brouns et al. . |
| 5,091,349 | 2/1992 | Alpert et al. . |
| 5,106,422 | 4/1992 | Bennett et al. . |
| 5,106,423 | 4/1992 | Clarke ........................... 166/293 X |
| 5,133,806 | 7/1992 | Sakamoto et al. . |
| 5,161,470 | 11/1992 | Dobozi et al. . |
| 5,166,109 | 11/1992 | Alpert et al. . |
| 5,168,008 | 12/1992 | Yoshida et al. . |
| 5,209,297 | 5/1993 | Ott .................................. 175/65 X |

FOREIGN PATENT DOCUMENTS 59-1048454A 8/1984 Japan .
883-704 4/1979 U.S.S.R. .

OTHER PUBLICATIONS

Cowen et al., "Conversion of Drilling Fluids to Cements with Blast Furnace Slag-Performance Properties and Applications for Well Cementing", SPE Paper No. 24575, Oct. 4, 1992.

*Primary Examiner*—George A. Suchfield

[57] ABSTRACT

A drilling and cementing operation is carried out utilizing a universal fluid comprising blast furnace slag, water and a polyalcohol, the components of the drilling fluid being chosen so as to have a dual functionality in promoting the drilling fluid and thereafter in being functional constituents of a cementitious slurry.

22 Claims, No Drawings

DRILLING AND CEMENTING WITH BLAST FURNACE SLAG/POLYALCOHOL FLUID

BACKGROUND OF THE INVENTION

This invention relates to drilling and cementing boreholes.

The drilling of boreholes is generally carried out using a rotary drilling process. The rotary drilling of a borehole is accomplished by rotating a drill string having a drill pipe and a drill bit at its lower end. Weight is applied to the drill bit while rotating to create a borehole into the earth. The drill string is hollow and sections are added to the drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a fluid down through the drill string and up to the surface between the drill string and the wall of the borehole.

Once the borehole has been drilled to the desired depth, it may be desirable to isolate the separate areas, zones or formations transversed by the borehole. For extraction of fluids from formations, a conduit (casing) must be inserted into the borehole extending from the surface downward, and liners may be hung inside the casing.

At this point it becomes necessary to fill the annulus between the casing and the borehole wall or between the liner and casing with a material which will seal the annulus (interfacial sealing) to inhibit communication between various formations penetrated by the wellbore and which will provide structural support for the casing or liner. This is commonly referred to as primary cementing.

Bonding of the cement to the casing and borehole surfaces is critical to providing an effective seal in the annulus and for providing support for casings. Under most conditions, the bonding of cement to casing is achieved through contact of the cement particles with the surface of the casing. The resulting region of contact provides a mechanical interface which impedes movement of the casing due to high frictional forces. A fluid seal between cement and casing is also effected by the close contact of the cement particles at the casing surfaces which results in a region of very low effective permeability that prevents fluid migration along the interface.

Bonding between the cement and borehole wall is also achieved through contact of the cement particles with the formation of drilling fluid filter cake commonly deposited at the borehole wall during the drilling of the borehole. However, bonding or interfacial sealing between the cement and borehole surfaces is not readily achievable. Cowan and Hale, U.S. Pat. No. 5,020,598 (Jun. 4, 1991) broadly disclose improved cement to casing sealing through the addition of a polyalcohol.

Generally, the borehole into which the casing or liner is introduced is filled with drilling mud. Conventional Portland cement and conventional drilling muds are incompatible. Thus, a mixture of conventional Portland cement and conventional drilling mud will not set up into a strong cement. In addition, the viscosity of such mixtures becomes uncontrollable and may either become too viscous to pump or may get thinner.

At the completion of drilling, the used drilling fluid is displaced from the borehole using some means to keep it separate from the cement to follow. This creates two problems. First, the means developed by the industry to keep the drilling fluid separate is relatively complex, involving the use of a landing collar and a pair of wiper plugs. In addition, the thus-displaced drilling fluid must be disposed of. Wyant et al, U.S. Pat. No. 3,499,491 (Mar. 10, 1970) proposed a partial solution to this problem by mixing a cementitious material such as Portland cement with powdered sodium silicate glass and a treated drilling fluid. While this does solve the problem of drilling fluid disposal since the drilling fluid is incorporated into the cement, it necessitates the use of extraneous components in order to achieve a sufficient degree of compatibility to make the cement work at all.

It would be desirable to have a drilling fluid where most or all of the components have both a drilling fluid function and a cementitious function. It would also be desirable to have a cementitious slurry made from a drilling fluid wherein all of the ingredients are compatible. Even where cements can be made by adding cementitious materials to drilling fluids, ingredients in the drilling fluid adversely affect the final cement even when they can be rendered sufficiently compatible to be operable. Peterson U.S. Pat. No. 4,780,220 (Oct. 25, 1988) discloses a conventional drilling fluids containing a polyglycerine component. Tragesser, U.S. Pat. No. 3,557,876 (Apr. 10, 1969) discloses various pozzolans in drilling fluids and, along with materials such as calcium oxide, in cementitious materials.

SUMMARY OF THE INVENTION

It is an object of this invention to provide a universal drilling fluid which is transformable to a cement.

It is a further object of this invention to provide a drilling fluid having components characterized by dual functionality in promoting both the drilling operation and the cementing operation.

It is yet a further Object of this invention to provide a universal fluid transformable into a cement without the addition of extraneous compatibility additives.

It is yet a further object of this invention to improve interfacial sealing.

In accordance with this invention, drilling is carried out utilizing a fluid comprising water, blast furnace slag and a polyalcohol. Thereafter the drilling fluid is activated to produce a cement.

DETAILED DESCRIPTION OF THE INVENTION

It has been found that a drilling fluid transformable to a cement can be produced utilizing components which are characterized by (a) dual functionality in promoting both the drilling operation and the cementing operation and, (b) compatibility with each other. Such a universal fluid avoids the problems of incompatibility and the necessity for adding extraneous compatibilizing agents and further avoids a compromise on the quality of the drilling fluid and the cement.

Definitions

In this description, the term "universal fluid" means a blast furnace slag-containing aqueous composition suitable for drilling which, on activation, sets up into a cement.

By "cementitious slurry" is meant a slurry comprising blast furnace slag and ingredients which cause the slurry to harden.

By "direct fluid contact" between the displacement fluid and the cementitious slurry is meant that the displacement fluid directly contacts the upper surface of the column of cementitious slurry as opposed to having a solid wiper plug and/or spacer fluid disposed between the cementitious slurry and the displacement fluid. By "direct fluid contact" between the cementitious slurry and the drilling fluid or mud is meant that the cementitious slurry directly contacts the upper surface of the column of drilling fluid or mud as opposed to having a wiper plug with a rupturable diaphragm and/or spacer fluid disposed between the cementitious slurry and the drilling fluid or mud.

The term "pipe" means either a casing or a liner.

The term "primary cementing" refers to any cementing operation wherein a cementitious slurry is passed into an annulus surrounding a pipe and thus encompasses both the cementing of casings wherein the annulus is between the casing and the borehole wall and the cementing of liners where the annulus includes an annulus between the liner and the casing.

By "activator system" is meant either a single activator or a mixture of activators.

By "cuttings" stabilizer is meant a material which inhibits disintegration of cuttings which is indicative of a wellbore or shale or formation stabilizer.

By "borehole stabilizer" or "wellbore stabilizer" is meant an additive or system of additives that reduces the stress state of the wellbore and/or modifies the wellbore such that strength of the formation is enhanced, or chemically passivates clays in the formation pores to reduce formation damage (reduce effective permeability).

By "shale stabilizer" is meant an additive or additive system which stabilizes cuttings which is indicative of the ability to stabilize a borehole (wellbore).

By "soluble", as it relates to polyalcohols, is meant a material containing alcohol groups and generally ether linkages which, primarily because of a low ratio of ether to alcohol linkages, is sufficiently soluble in water at room temperature that at least 80 grams will dissolve in 100 grams of water. Lower molecular weight also tends to make the polyalcohols more soluble.

By "insoluble", as it relates to alcohols, is meant a material containing alcohol and generally ether linkages which, primarily because of a high ratio of ether to alcohol linkages, or hydrocarbon chains from dihydric alcohols, is substantially insoluble in water at room temperature. Higher molecular weight also tends to make the alcohols more insoluble. Generally, the insoluble alcohol is a polyalcohol too.

As used herein "down" or "in" as it relates to a drill string or casing means in a direction toward the farthest reach of the borehole even though in some instances the borehole can be disposed in a horizontal position. Similarly, "up" or "out" means back toward the beginning of the borehole.

Universal Fluid Composition

The universal fluid comprises:

a) an aqueous medium,
b) blast furnace slag,
c) a polyalcohol
d) generally a secondary fluid loss additive,
e) generally a rheology control agent (viscosifier),
f) optionally, a weight material (as needed),
g) optionally, a shale stabilizer (as needed),
h) optionally, a deflocculant (as needed).

The above description does not, however, dictate that the composition will have at least eight ingredients just for the drilling function. Another novel feature of this invention is the use of components which (a) have a dual functionality in that they have an important drilling fluid function and an important cementitious slurry function, and (b) may have two or more drilling fluid functions and/or two or more cementitious slurry functions. The polyalcohol, for instance, functions as a retarder, a shale stabilizer and as a fluid loss additive in the drilling fluid and then functions as a rheology control agent in the subsequent cementitious slurry as is discussed in more detail hereinbelow. The polyalcohol functions in combination with salt to give particularly good shale stabilization as is discussed hereinafter in connection with the aqueous medium. This is particularly true with the mixtures of soluble and insoluble polyalcohols which are discussed hereinafter.

Aqueous Medium

The term "aqueous medium" is intended to encompass both fresh water and salt water, including any fluid having water as the continuous phase, including oil-in-water emulsions, as well as essentially oil-free water based drilling fluids.

It is generally desired that the drilling fluids use water containing dissolved salts, particularly sodium chloride. In these instances, 0.1 to 26 wt %, preferably 3 to 20 wt % sodium chloride based on the weight of the continuous phase may be used. In some instances 5 to 20 wt % may be preferred. One suitable source is to use seawater or a brine solution simulating seawater. The strength of the resulting cement is actually enhanced by the salt which is contrary to what would be expected in view of the intolerance of Portland cement to brine. Various salts, including organic salts, are suitable for use in the drilling fluid used in this invention in addition to, or instead of NaCl, including, but not limited to, NaBr, KCl, $CaCl_2$, $NANO_3$, $NaC_2H_3O_2$, $KC_2H_3O_2$, $NaCHO_2$, $CsCHO_2$ and $KCHO_2$. Sodium chloride is usually preferred, as noted above. These salts can be used, if desired, from 0.1 wt % up to the saturation point under the conditions employed.

The use of a salt solution such as seawater is particularly advantageous because salts such as sodium chloride act as a shale stabilizer in the drilling fluid in addition to enhancing the strength of the cement as noted hereinabove.

The salt modification of the aqueous phase to lower the water activity and increase the ionic strength results in stabilized cuttings as well as actual wellbore stabilization.

Blast Furnace Slag

Blast furnace slag is an essential ingredient of the universal fluid composition used in this invention. It serves as a latent cementitious component in the drilling fluid and further serves in the cementitious slurry as the cementitious constituent.

While setting must be retarded during drilling, the blast furnace slag is still a desired and essential ingredient in the drilling fluid for two reasons. First, it allows laying down a settable filter cake during drilling. Second, it provides a compatible residual material in the borehole for the cementitious slurry.

By "blast furnace slag" is meant the hydraulic refuse from the melting of metals or reduction of ores in a furnace. Such material is disclosed in Hale and Cowan, U.S. Pat. No. 5,058,679 (Oct. 22, 1991), the disclosure of which is incorporated herein by reference.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a Blaine specific surface area between 2,000 cm$^2$/g and 15,000 cm$^2$/g and more preferably, between 3,000 cm$^2$/g and 15,000 cm$^2$/g, even more preferably, between 4,000 cm$^2$/g and 9,000 cm$^2$/g, most preferably between 4,000 cm$^2$/g and 8,500 cm$^2$/g. An available blast furnace slag which fulfills these requirements is marketed under the trade name "NEWCEM" by the Blue Circle Cement Company. This slag is obtained from the Bethlehem Steel Corporation blast furnace at Sparrows Point, Md.

A usual blast furnace slag composition range in weight percent is: $SiO_2$, 30–40; $Al_2O_3$, 8–18; CaO, 35–50; MgO, 0–15; iron oxides, 0–1; S, 0–2 and manganese oxides, 0–2. A typical specific example is: $SiO_2$, 36.4; $Al_2O_3$, 16.0; CaO, 43.3; MgO, 3.5; iron oxides, 0.3; S, 0.5; and manganese oxides, <0.1.

Blast furnace slag having relatively small particle size is frequently desirable when used to form the cementitious slurry because of the greater strength it imparts in many instances to a final cement.

Characterized in terms of particle size the term "fine" can be used to describe particles with a Blaine specific surface area in the range of 4,000 to 7,000 cm$^2$/g, corresponding to 16 to 31 microns in size; "microfine" can be used to describe those particles with a Blaine specific surface area from greater than 7,000 cm$^2$/g to 10,000 cm$^2$/g that correspond to particles of 5.5–16 microns in size and "ultrafine" can be used to describe particles with a Blaine specific surface area over 10,000 cm$^2$/g that correspond to particles 5.5 microns and smaller in size. Small particle size blast furnace slags are available from Blue Circle Cement Company, Koch Minerals, Wichita, Kans. under the trade name "WELL-CEM", and from Geochem under the trade name "MICROFINE MC100".

However, it is very time consuming to grind blast furnace slag to these particle sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

A blast furnace slag having a polydispersed particle size distribution exhibiting at least two nodes on a plot of particle size versus percent of particles in that size can be utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4 wt % of the slag, would need to be ground to the ultrafine particle size. Generally, 5 to 25 wt %, more preferably 5 to 10 wt %, can be ground to the ultrafine particle size and the remainder ground in a normal way thus giving particles generally in a size range of greater than 11 microns, the majority being in the 11 to 31 micron range.

In some instances, it may be desirable in the final cementitious slurry to use a mixture of the blast furnace slag and Portland cement. If such additional component is incorporated into the drilling fluid to produce the cementitious slurry, it can be incorporated in an amount within the range of 1 to 100 wt % of the weight of the blast furnace slag in the cementitious slurry, preferably 10 to 99 wt %, more preferably 15 to 50 wt %. That is, at 100 wt %, the weight ratio would 1:1. The basis here is the total blast furnace slag actually in the cementitious slurry, including that carried over from the drilling operation and any added along with the activator. The Portland cement acts as an activator for the blast furnace slag and thus in one embodiment, no other activator is utilized.

Silicate

The silicates broadly encompass any silicate salt, or silicic acid, which will form a salt in the drilling fluid. Alkali metal soluble silicates such as sodium silicate are preferred. Appliable silicates as exemplified by sodium silicate are those having a $SiO_2:Na_2O$ weight ratio within the range of 1.6 to 3.5.

Retarder

A retarder is an essential ingredient of the universal fluid composition used in this invention. Organic compounds in general and more specifically, low molecular weight organic acids, are suitable retarders. Lignosulfonates, including both chrome lignosulfonate and chrome-free lignosulfonate, can serve as retarders.

Retarders are generally compounds which have OH$-$, COOH, BO$_3$ or BO$^-_4$ functional groups which are a part of or can be released from the compound in solution. Chelating agents are also retarding agents. Such agents include lignosulfates, citric acid, EDTA, and borax. Other retarding materials include phosphonates, such as those used in scale inhibition in oil and gas wells and also in water treatment processes for boilers, cooling towers, etc. Examples of such materials are those marketed by Monsanto Company under the trade name "DEQUEST". Specific examples are DEQUEST 2000, 2006, 2010, 2016, 2060, and 2066.

Other retarding materials include some phosphates such as sodium, potassium, calcium or magnesium glycerophosphates, borates such as boric acid and its salts, salts of organic acids such as sodium or potassium gluconate, sodium or potassium glucoheponate and sodium citrate. Organic amines can also be retarders.

Combinations of borax, boric acid or other borate salts and some borate ester surfactants such as monoethanolamine borate with lignosulfonate or organic acid salts are good high temperature retarders. These are commonly used for high temperature retarders for cements. Salts of organic polyacids such as EDTA, polyacrylic acid, polymethacrylic acid, itaconic acid, fumaric acid can also retard in some temperature ranges.

Preferred retarders are polyalcohols since they are required components of the drilling fluid. Discussed in detail hereinbelow are suitable cyclic polyols, ethoxylated propoxylated alcohols and epoxy-containing cyclic polyetherpolyols. If secondary retarders (i.e., in addition to the polyalcohol) are used, they are generally used in an amount within the range of 0.1 to 30, preferably 5 to 25 volume percent based on volume of drilling fluid, or 0.1 to 30, preferably 5 to 25 wt % based on weight of the cementitious (fluid) phase of the drilling fluid.

Polyalcohols Broadly

Suitable polyalcohols include polyols having at least two carbon atoms and two hydroxyl groups but no more than 18 carbon atoms and 13 hydroxyl groups. Nonlimitative examples of such polyalcohols include (carbon chains may be straight chains, branched chains or cyclic) ethylene glycol, diethylene glycol, 1,2-propanediol, 1,3-propanediol (propylene glycol), neopentyl glycol, pentaerythritol, 1,6-hexanediol, glycerol, open and cyclic condensation products of glycerol (and/or other polyalcohols) such as diglycerols, triglycerols, tetraglycerols, pentaglycerols, and hexaglycerols, poly(ethylene glycol)s, poly (propylene glycol)s, ethylenepropylene glycol, poly (ethylenepropylene glycol )s, ethylenepropylene glycol copolymers and ethylenebutylene glycol copolymers and ethylenebutylene glycol copolymers, 1,5,6,9-decanetetrol, 1,1,4,4-cyclohexanetetramethanol, 1,2,4,5-cyclohexanetetramethanol, 1,4-cyclohexanedimethanol, 1,3-cyclopentanedimethanol, 1,2,4,7-heptanetetrol, 1,2,3,5-heptanetetrol, 1,5,8-nonanetriol, 1,5,9-nonanetriol, 1,3,5,9-nonanetetrol, 1,3,5-heptanetriol, 2,4,6-heptanetriol, 4,4-dimethyl-1,2,3-pentanetriol, 1,1,3-cyclohexanetrimethanol, 1,3,4-cycloheptanetriol, 1,1-cyclopropanediol, 1,2-cyclopropanediol, 1,2,3-cyclopropanetriol, 1,1-cyclopropanedimethanol, 1,2-cyclopropanedimethanol, 1,2,3-cyclopropanetrimethanol, 1,1-cyclobutanediol, 1,2-cyclobutanediol, 1,3-cyclobutanediol, 1,2-cyclobutanedimethanol, 1,2,3-cyclobutanetriol, 1,2,4-cyclobutanetriol, 1,2,3,4-cyclobutanetetrol, 1,3-dimethyl-1,2,3,4-cyclobutanetetrol, 1 hydroxy cyclobutanemethanol, 2-methyl-1,2-butanediol, 2-methyl-1,2-butanediol, 3-methyl-2,2-butanediol, 1,2-pentanediol, 1,3-pentadiol, 1,4-pentanediol, 2,3-pentanediol, 2,4-pentanediol, 1,2,3-pentanetriol, 1,2,4-pentanetriol, 2,3,4-pentanetriol, 1,1-cyclopentanediol, 1,2-cyclopentanediol, 1,3-cyclopentanediol, 1,2,3-cyclopentanetriol, 1,2-hexanediol, 1,3-hexanediol, 1,2,3-hexanetriol, 1,2,4-hexanetriol, 1,2,3,4-hexanetetrol, 1,1-cyclohexanediol, 1,2-cyclohexanediol, 1,4-cyclohexanediol, 1,2,4-cyclohexanetriol, 1,2,5-cyclohexanetriol, 1,2,3,4-cyclohexanetetrol, and 1,2,3,5-cyclohexanetetrol and mixtures thereof.

Cyclic Polyol Production

A general chemical composition formula, disregarding the order, representative of one class of polyols is as follows:

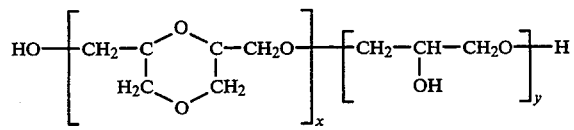

where $x \geq 1$ and $y \geq 0$.

As a specific example, x=2 and y=5. Also of significance is the ether-to-alcohol ratio which is given by the following formula (for polyetherpolyols produced from glycerol):

$$e = \frac{3x + y - 1}{y + 2}$$

where e=the ratio, x=the number of rings and y=the number of glycerol molecules incorporated into the molecule but not in the ring structure. If $\times =0$ then the ratio varies from 0.25 to a value approaching 1. Preferably x is not 0, i.e., preferably the polyol is a polyethercyclicpolyol. A typical e range for such polyalcohols is 1.4 to 1.8. The sum of 2x+y yields the number of glycerol monomers constituting the polymer.

A more complete description of these polyethercyclicpolyols is found in Hale and Cowan, U.S. Pat. No. 5,058,679 (Oct. 22, 1991), the disclosure of which is incorporated herein by reference. Broadly, the reaction involves heating a polyol with at least three hydroxyl groups, at least two of which are adjacent each other, with removal of water to form a condensed product.

With glycerol as the primary reaction medium, it is preferable to remove at least 1.05 and more preferably, at least approximately 1.12 but no more than 1.2 moles of water per mole of glycerol. Most preferably, 1.12 to 1.15 moles of water per mole of glycerol in the product should be removed. If the feed contains an appreciable amount of predehydrated glycerol polymers, then the remaining dehydration will be less than 1.2 moles per mole of glycerol. As an example, for a known commercial product which typically contains 15 percent by weight of bis(hydroxymethyl)-dioxanes, and 85 percent by weight of glycerol, the dehydration can be calculated as follows. For approximately 100 grams of feed there are 85 grams of glycerol (0.92 moles) and 15 grams of bis(hydroxymethyl)-dioxane (0.1014 moles). The glycerol component will have to lose $0.92 \times 1.2 = 1.104$ moles of water. The 0.1014 moles of bis(hydroxymethyl)-dioxane is derived from 0.2028 moles of glycerol by removal of 0.2028 moles of water; 1.2 total moles water per mole of glycerol should be removed, i.e., $0.2028 \times 1.2 = 0.2434$ moles. Thus, it is necessary to remove 0.2434−0.2028=0.0406 moles of water. The total to be removed is 1,104 moles from the glycerol +0.0406 moles from the bis(hydroxymethyl)-dioxane =1.1496 moles water (or approximately 1.15 moles) from the 100 grams of the known commercial product.

Therefore, it is necessary to remove close to 1.2 moles of water for each mole of glycerol which enters into the condensation of an initially partially dehydrated glycerol feed stream. Alternatively, in most cases involving complex feed streams, it would be appropriate to carry out the reaction and select a final maximum reaction temperature at set pressure conditions, such as is known from previous experience to yield satisfactory polyethercyclicpolyol preparations.

From 5 to 35 wt % of the polyol can be replaced with a dihydroxy alcohol if it is desired to make a less water-soluble product. Suitable dihydroxy alcohols include those having 2 to 18 carbon atoms, preferably those having 4 to 14 carbon atoms. Suitable dihydroxy alcohols include ethylene glycol, propylene glycol, diethylene glycol and triethylene glycol, for instance.

The solubility in water is a function of molecular weight, the presence or absence of long chain dihydric alcohol units, and ether units, with either higher molecular weight, long chain dihydric alcohols or higher ether ratios, or all three, giving insoluble polyols.

Epoxy-containing Cyclic Polyetheralcohols

In some instances it may be desirable to use a polyol containing paraffinic and/or aromatic groups linked by ether linkages to the polyol structure, these ether linkages having their origin in glycidyl ether or epoxy groups. Such polyols can be produced as disclosed in said Hale and Cowan patent for polyethercyclicpolyols generally except an epoxy resin is incorporated by reaction. Specifically, they can be produced by:

(a) heating a reaction mixture comprising a reactant selected from the group consisting of (1) a polyol having at lease three hydroxyl groups of which at least two of the hydroxyl groups are vicinal, (2) precursors of the polyol, (3) cyclic derivatives of the polyol, and (4) mixtures thereof, said heating initiating the thermal condensation:

(b) removing water formed during the thermal condensation; and (c) prior to the condensation going to completion, admixing an epoxy resin with the reaction mixture.

Epoxy resins are characterized by the presence of a three-membered cyclic ether group commonly referred to as an epoxy group, 1,2-epoxide, or oxirane. Preferred epoxy resins are diglycidyl ethers, triglycidyl ethers, tetraglycidyl ethers as well as multifunctional glycidyl ethers with more than four epoxy rings which, in the reacting glycerol or polyol medium, result in the formation of higher molecular weight polyethercyclicpolyols with substantially improved properties in connection with drilling fluid performance.

A particularly useful epoxy is a difunctional glycidyl ether such as "EPON 828" (a trademark of Shell Oil Company) which significantly increases the number average ($M_w$) molecular weight of a significant fraction of the polyethercyclicpolyols preparation. While not wishing to be bound by theory, addition of 3 weight percent of "EPON 828" could result in doubling the molecular weight of between 10 and 20 percent of the preparation. By thus increasing the molecular weight of a significant portion of the preparation, the copolymerization of "EPON 828" results in significantly boosting the $M_w$ value of the sample, with attendant significant improvements in the performance of the resulting polyethercyclicpolyols polymer/polyethercyclicpolyols diglycidyl ether copolymer mixture.

In order to obtain polyethercyclicpolyols with maximum coverage potential, it is suitable to use tri- and tetraglycidyl ethers which will direct polymerization along more than one direction in a planar configuration. It is theorized, although the invention is not limited by this theory, that the use of such epoxies facilitates the coverage of openings in the clay surface of an oil well through which water can enter the clay. While not wishing to be bound by theory, applicants believe that molecules which are substantially planar in structure are most useful with the invention when it is employed as part of a drilling fluid additive. Additionally, the attachment of several polyethercyclicpolyols onto the same central molecule of polyglycidyl ether, allows multiple coordination of cationic species to occur through the electron donating oxygen atoms in the ether linkages, which results in formation of large molecular aggregates that can inhibit the migration of water molecules from the aqueous phase of the water-based drilling mud onto the hydrophilic clay solids of the formation. Water-based drilling muds containing polyethercyclicpolyols act essentially in a manner similar to that of oil-based muds. This theory, of course, is not limiting of the application of this invention.

Experimental results have shown that the impact of using multifunctional glycidyl ethers on the values of $M_w$ and on the performance also observed on inhibition of fluid loss and dispersion.

Although the observation of bimodal distribution of molecular weights in GPC (three-column chromotography) does not require the presence of epoxies, nevertheless, incorporation of epoxies into the polyethercyclicpolyols structure has a significant impact on the relative amounts of "large" molecules in the polyethercyclicpolyol production, increasing the ratio of large volume molecules/small volume molecules.

The following epoxies are considered useful in the present invention:

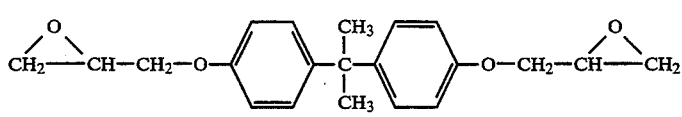

"EPON 828"
(trade name for epoxy manufactured by Shell Oil Company)

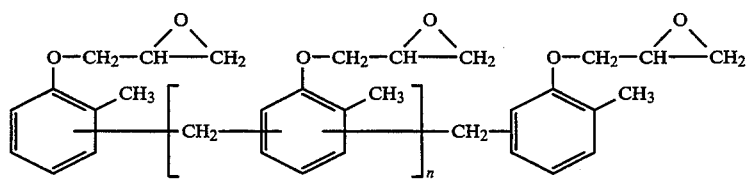

"EPON DPS 164"
(trade name for epoxy manufactured by Shell Oil Company)

-continued

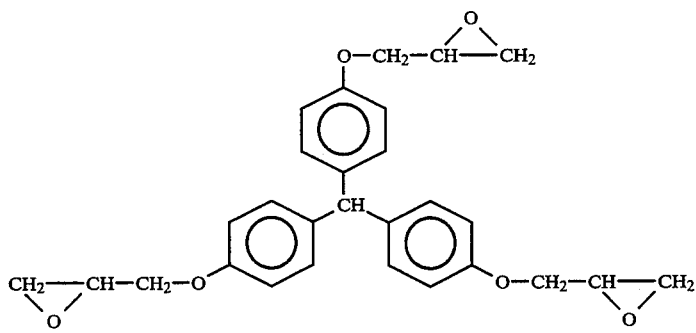

"TACTIX 742"
(trade name for epoxy manufactured by Dow Chemical Company)

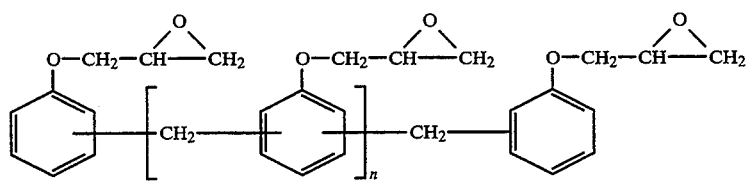

"NOVOLAC"
(trade name for epoxy manufactured by Shell Oil Company)

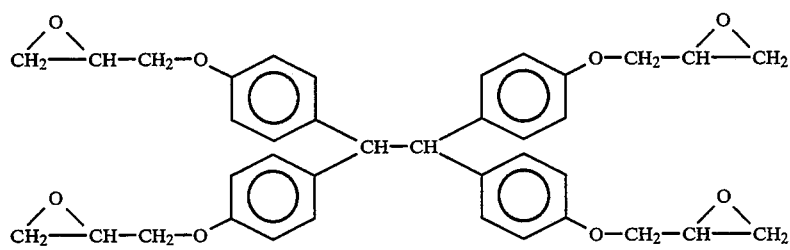

"EPON 1031"
(trade name for epoxy manufactured by Shell Oil Company)

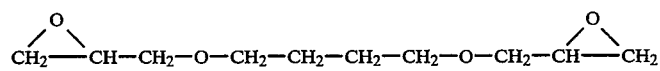

"HELOXY 67"
(trade name for epoxy manufactured by Rhone-Poulenc)

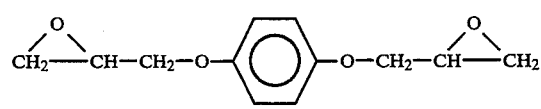

"HELOXY 69"
(trade name for epoxy manufactured by Rhone-Poulenc)

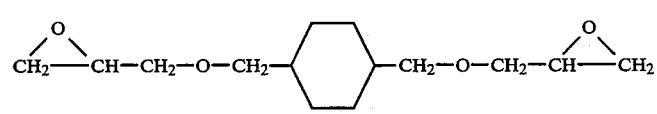

"HELOXY 107"
(trade name for epoxy manufactured by Rhone-Poulenc)

-continued

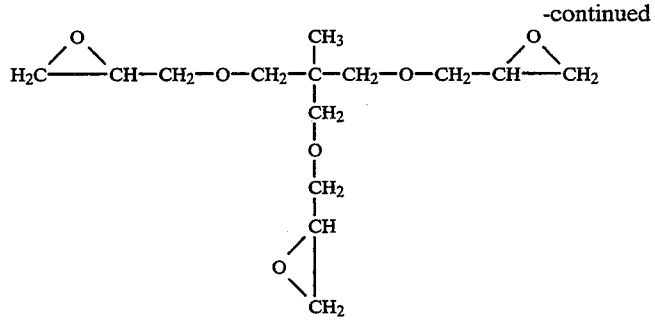

"HELOXY 5044"
(trade name for epoxy manufactured by Rhone-Poulenc)

With respect to "EPON 828", it is preferred to add the material in a plurality of aliquots, generally two or three aliquots, generally observing the layered addition until about 40 to 50 percent of the reaction is complete.

With "EPON 1031", it is suitable to add all the material at the beginning of the condensation reaction. It is suitable to add a larger amount of "EPON 828" than of "EPON 1031" because of the lower molecular weight of "EPON 828". It is preferred to avoid adding "EPON 828" at temperatures in excess of 270°C, due to risk of premature polymerization. The addition of more volatile polyglycidyl ethers must be carried out with caution due to their potential toxicity and relatively higher volatilities.

The epoxy resin can be used in an amount sufficient to give 0.5 to 5 weight percent material from the epoxy resin incorporated in the epoxy polyethercyclicpolyol. Alternatively, a relatively high epoxy content can be utilized, say 6 to 67, preferably 15 to 40 wt %. Thus, viewed in terms of the polyol, the epoxy component content can vary from 0 to 67 wt % based on the total weight of the polyol. In utilities where shale stabilization is the primary consideration, high epoxy content is preferred. In other instances, low epoxy content may be preferred.

The initial pressure can be higher when making the higher epoxy content polyols as compared with the initial pressure preferred for the low epoxy. For instance, the initial pressure can be greater than 180 torr. Generally, the initial pressure will be between 250 and 500, preferably 250-350 torr. When the starting polyhydric alcohol component is glycerine. The initial temperature is generally between about 175° and 275° C., preferably between 200° and 260° C., more preferably between 210° and 250° C.. If desired, the reaction can be terminated before 1.07 moles of water are removed per mole of polyol reactant. Preferably, the polyhydric alcohol monomer is introduced into the reaction zone in a single addition and the epoxy introduced in a plurality of additions, preferably 2 to 10, most preferably 3 to 6 when utilizing the higher epoxy. Generally, if higher epoxy content materials are being produced, more additions are utilized and the addition of the epoxy could be continuous.

During the course of the reaction the temperature with the preferred polyol, glycerol, is generally increased to a range of 250°-300° C., preferably 251°-280° C., more preferably 260°-273° C.. at essentially the initial pressure. Thereafter, the temperature is increased to 260°-310° C., preferably 261°-300, more preferably 280°-287° C.. at a pressure of less than 180, more preferably 40-130 mm Hg.

Ethoxylated Propoxylated Alcohols

Another preferred class of the polyalcohols is ethoxylated propoxylated alcohols of the following general formula $$R[(EO)_m-(PO)_n]_z OH$$

where
EO = an ethoxy unit
PO = a propoxy unit
R = an alkyl chain of 2-16 carbon atoms, preferably 3-12, most preferably 4-10 carbon atoms.

At least m or n is greater than 0. In these EO/PO copolymers m and n are variable and the sum of m plus n determines their number average molecular weight, which ranges from 500 to 15,000, preferably from 600 to 10,000.

The m/n ratio determines the hydrophobic/hydrophilic balance (HLB), water solubility and nonionic surfactant properties of the copolymer. Solubility depends on the ionic strength of the aqueous medium (higher ionic strength results in lower solubility) and temperature. The temperature relationship is in a sense an inverse relationship since at higher temperatures the polyalcohols exhibit a cloud point and at lower temperatures they go back into solution. High temperatures in some systems has the same effect as high salt solutions.

Polyalcohol Function

Soluble polyalcohols work in a similar way to the salt in that they lower water activity and bind to the clay so as to reduce the amount of hydration. In addition, high molecular weights soluble polyalcohols may reduce the communication between the formation pore pressure and the hydrostatic pressure due to mud weight. Both mechanisms are advantageous in terms of cuttings stability and actual wellbore stability. Thus, the polyalcohol acts in combination with the salt to give good shale stabilization While Applicants do not wish to be bound by theory, it is believed the insoluble (essentially insoluble, there is some wetting of the alcohol) alcohols function primarily by a plugging action whereby they prevent mud weight/formation pore pressure communication. This is not just a simple mechanical plugging, however. The alcohol groups bind to the clay structure. The combination of soluble and insoluble alcohols results in better wetting of the insoluble alcohols and thus better delivery to the pore throats. This is independent of the soluble alcohols beneficial functions previously discussed. Also, in systems having both salt and polyalcohol, the benefits of both are still obtained.

If the pore throats are large enough, the soluble alcohol will bind to the clay particles in the shale and reduce hydration. The same reaction will be the reason that the polyalcohol will enable high solids tolerance in the drilling fluid. Binding and coating the solids (clays, formation solids and other loose drilling fluid solids) will lower the particle to particle interaction which will lower the viscosity.

Again, while not wishing to be bound by theory, applicants believe wellbore stability is enhanced when polyalcohols are used because the soluble polyalcohols form micelles which micelles plug pore entrances.

Thus, density alone does not determine the effectiveness of a drilling fluid in maintaining sufficient pressure to counterbalance the formation pressure. There is also a chemical effect. The cuttings/wellbore (shale) stabilizers described herein, particularly the soluble high molecular weight polyalcohols, insoluble polyalcohols and ethoxylated/propoxylated polyalcohols may lower mud weight pore pressure communication so the mean effective stress is not lowered in the formation. Thus pore pressure is not increased and thus borehole instability is reduced. While not wishing to be bound by theory, it is believed the soluble alcohol in solution binds water in the drilling fluid which lowers the water activity of the drilling fluid, i.e., lowers the molar free energy of the solution. The resulting molar free energy of the water in the drilling fluid compared with that in the formation results in a chemical stabilization of the wellbore by not increasing the formation pore pressure or possibly lowers the pore pressure, thus keeping the stress state of the wellbore such that it does not exceed the strength of the formation.

If only one polyalcohol is used it is preferably either a soluble polyalcohol with a relatively high weight average ($M_w$) molecular weight, say in excess of 50,000 or else a low molecular weight insoluble alcohol, say one having a molecular weight of less than 10,000.

Alternatively, a mixture of a soluble and an insoluble alcohol can be used. Particularly preferred are mixtures of (a) a cyclic polyetherpolyol which is water soluble with (b) a cyclic or acyclic polyetherpolyol which is insoluble.

Polyethercyclicpolyols having a ratio of x:y within the range of 5:2 to 1:10 represent a preferred class of soluble polyethercyclicpolyols. The soluble polyalcohols and mixtures thereof have been found to improve interfacial sealing. The insoluble polyol can be any polyol broadly, or a cyclic polyetherpolyol. Preferred insoluble polyols include polyglycols such as poly(propylene glycol) of sufficiently high molecular weight to be insoluble.

The polyalcohols, particularly the polyethercyclicpolyols, perform a number of separate functions in addition to retardation. They function in the drilling fluid as a shale stabilizer and fluid loss additive in addition to retarding the setting of the slag during drilling and then in the cementitious slurry they serve as a rheology control agent reducing the increase in viscosity of the cementitious slurry thus making it more pumpable. While not wishing to be bound by theory, applicants believe the fluid loss prevention comes about indirectly. The polyalcohol has a wetting capability and absorbs onto polymers and/or clay in the drilling fluid as noted above and perhaps otherwise modifies the drilling fluid, thus improving the fluid loss capability of the additives in the system. The polyalcohols also tend to improve bonding of the cement to the casing or liner and to the wellbore.

Fluid Loss Additive

A fluid loss additive is generally selected from synthetic polymers such as biopolymers, starch, clay, and, as noted hereinabove, polyalcohols such as cyclicpolyetherpolyol (which probably acts primarily as an enhancer for the others). Carboxymethyl cellulose can also be used although because of the presence of salt, a higher concentration is needed (as compared with other polymers) to be effective.

Clay, when used, is generally present in an amount within the range of 2 to 50, preferably 5 to 30, more preferably 10 to 20 lbs/bbl of drilling fluid.

Rheology Control

A rheology control agent in the context of a drilling fluid keeps solids from settling out and may be viewed as a viscosifier. The preferred viscosifiers for the universal drilling fluid include biopolymers and silicates. Silicates can also function as borehole stabilizers. Starch can also function, generally in a secondary role, as a viscosifier. Silicates, for instance, when used, are generally used in an amount within the range of 2 to 15, preferably 5 to 10 lbs/bbl of drilling fluid. The biopolymer can be used in an amount within the range of about 0.1 to 3, preferably 0.2 to 1 lbs/bbl of drilling fluid. All of the components, if used, are used in an amount effective to produce the desired effect, i.e., in this case, a sufficient increase in viscosity so that the mud will carry cuttings up out of the borehole.

Weight Material

The universal drilling fluid must be formulated to have the weight required for a particular drilling operation being conducted. This is well known in the art and in many instances sufficient weight may be provided by the blast furnace slag. Optionally, however, the weight can be adjusted using conventional weighting agents such as barite (barium sulfate). The amount, if any, used would be the amount necessary to give the desired mud density. Other suitable weighting agents include titanium oxides such as $TiO_2$ and iron oxides such as hematite and ilmenite.

Shale Stabilizer

This is an optional ingredient. In some formations, the zones being drilled do not require stabilization. Also, in instances where a silicate is used as rheology control agent, it also functions as a shale stabilizer as does lime, if present. Again, the polyalcohol serves as a shale stabilizer in addition to a retarder. Finally, as noted above, in systems where the aqueous medium contains a salt, the salt acts as a shale stabilizer.

Deflocculant

A deflocculant such as a carbohydrate polymer can be used if needed. Generally, deflocculants, if present, will be used in an amount within the range of 0.5 to 10 lbs/bbl of drilling fluid.

Dual Functionality Detail

The following Table summarizes these dual functionality concepts.

TABLE A

| | Function | | | |
| --- | --- | --- | --- | --- |
| | Drilling Fluid | | Cementitious Slurry | |
| Additive | Primary | Secondary | Primary | Secondary |
| Water | Cuttings Carrier | | Hydrating Agent | |
| Synthetic polymer[1] | Fluid loss control | | Fluid loss control | |

TABLE A-continued

| Additive | Function | | | |
|---|---|---|---|---|
| | Drilling Fluid | | Cementitious Slurry | |
| | Primary | Secondary | Primary | Secondary |
| Starch[2] | Fluid loss control | Viscosity | Fluid loss control | Viscosity |
| Biopolymer[3] | Viscosity | Fluid Loss | Viscosity | Retarder |
| Silicate | Viscosity | Shale stabilizer | Accelerator | — |
| Carboxylate polymer[4] | Deflocculant | Retarder | Deflocculant | Retarder |
| Barite[5] | Density | — | Density | Solids for compressive strength |
| Bentonite[6] | Fluid loss control | — | Fluid loss control | Solids for compressive strength |
| Clay/Quartz dust[7] | — | — | Solids | |
| Slag[8] | Cementitious | Weight cuttings stabilizer | Cementitious agent | Solids |
| Lime[9] | Shale stabilizer | Alkalinity | Accelerator | Solids |
| PECP[10] polyalcohol | Shale stabilizer retarder | Enhance fluid loss properties | Rheology control | Bond Improver |
| NaCl | Shale stabilizer | — | Strength enhancement | — |

[1] A synthetic polymer manufactured by SKW Chemicals Inc. under the trade name "POLYDRILL", for instance.
[2] Starch made by Milpark Inc. under the trade name "PERMALOSE", for instance.
[3] "BIOZAN", a biopolymer made by Kelco Oil Field Group, Inc., for instance. This is a welan gum and is described in U.S. Pat. No. 4,342,866.
[4] A water-soluble carbohydrate polymer manufactured by Grain Processing Co. under trade name "MOR-REX", for instance.
[5] Barite is BaSO$_4$, a drilling fluid weighting agent.
[6] Bentonite is clay or colloidal clay thickening agent.
[7] A clay/quartz solid dust manufactured by MilWhite Corp. under the trade name "REVDUST", for instance.
[8] Blast furnace slag manufactured by Blue Circle Cement Co. under the trade name "NEWCEM" is suitable.
[9] CaO
[10] Polycyclicpolyetherpolyol Functionally, there are three essential and five optional ingredients in an ideal drilling fluid, namely,
1) a cuttings carrier,
2) a latent cementitious material
3) a retarder,
4) generally a fluid loss additive,
5) generally a rheology control agent (viscosifier),
6) (optional) a shale stabilizer, and
7) (optional) a weighting agent.
8) (optional) a deflocculant In functional terms, there are two essential ingredients and several optional ingredients in a cementitious slurry, namely,
1) the cementitious or hydratable material itself,
2) hydrating agent,
3) (Optional) accelerator (essential but may be provided by action of heat and/or the ingredients present in the drilling fluid).
4) (Optional) rheology control/thinner (as needed).
5) (Optional) density agent (as needed).
6) (Optional) fluid loss control (will always be carried over from the drilling fluid),
7) (Optional) a shale stabilizer (as needed). Will generally be carried over from the drilling fluid,
8) (Optional) solids or aggregate, and
9) (Optional) strength enhancing agents.

As can be seen from the above Table, a composition as simple as one having water, blast furnace slag and a polyalcohol provides all of the essential and all but one (viscosifier) of the optional drilling fluid functions and all of the essential cementitious functions. This is because the water serves as the cuttings carrier in the drilling fluid and the hydrating agent in the cementitious slurry. The blast furnace slag serves a two-fold function by providing the essential cementitious function and the optional weight function in the drilling fluid and serves the dual function of providing the cementitious material in the cementitious slurry. The polyalcohol serves the four-fold function in the drilling fluid of retardation of the hydration of the blast furnace slag during drilling, modification of the water activity of the aqueous continuous phase (shale stabilization), reduction of mud weight/pore pressure communication and fluid loss control in the drilling fluid and then serves the dual function as a rheology control agent in the cementitious slurry to give the desired thinning. The polyalcohol also serves in the final cement as sealant or bond improver.

Preferably, the universal fluid composition further contains a salt such as sodium chloride to provide further shale stabilization and strength enhancement in the cementitious slurry. Similarly, the composition preferably contains a secondary fluid loss control agent such as a sulfonated synthetic polymer or starch (which also gives viscosity). Also, it may be preferred in many instances to use a biopolymer to give viscosity and a silicate such as sodium silicate to give further viscosity and shale stabilization. The silicate further serves as an accelerator in the cementitious slurry. Similarly, lime may be present to further give cuttings/wellbore stabilization and to provide alkalinity in the drilling fluid and to function as an accelerator and solids in the cementitious slurry.

Almost always a clay such as bentonite or prehydrated bentonite will be present which provides fluid loss control in the drilling fluid and in the cementitious slurry and also solids in the cementitious slurry. The clay is frequently included in the initial drilling fluid and in any event will almost always be encountered during drilling. Frequently, clay, prehydrated in fresh water, is used initially to give the functions such as fluid loss control since the clay in a salt water environment does not hydrate readily and thus imparts less viscosity to the fluid. This is generally referred to as the "yield", i.e., the amount of viscosity imparted by the clay.

If flocculation is a problem in a particular system, a deflocculant such as a carbohydrate polymer, acrylate polymer, sulfonate polymer, styrene maleic anhydride polymer, organic acid or polyalcohol can be used which will also provide retardation of the blast furnace slag during drilling and act as a deflocculant in a cementitious slurry.

Finally, if additional weight is desired in the drilling fluid, this can be provided with a weighting agent such as barite or bentonite which will also give solids and weight to the cementitious slurry.

The clay/quartz dust is shown in Table A and was used in laboratory tests of drilling fluids to simulate drill solids produced in actual drilling, and thus would not generally be added to an actual drilling fluid.

While the ingredients can be added in any order, there are two combinations where a significant improvement flows from the addition sequence. First, if a biopolymer and lime are used, the biopolymer should be added after the lime. This gives better yield, i.e., enhances viscosity imparted and fluid loss prevention capabilities. Second, polymers such as starch and biopolymers should be added before the polyalcohol to allow the polymers to hydrate before contact with the polyalcohol. This gives better hydration and thus better polymer extension (swelling).

Unlike Portland cement which is incompatible with ingredients which are invariably in drilling fluids, blast furnace slag is compatible with drilling fluids. This is shown in Hale and Cowan, referred to hereinabove. Thus, blast furnace slag can simply be added to any conventional drilling mud to give a drilling composition which can thereafter be set through the action of an activator as in this invention. Such systems are entirely operable and represent an advance in the art. However, while compatible with drilling fluids, blast furnace slag tends to deactivate the function of certain ingredients common in drilling fluids. For instance, drilling fluids can contain partially hydrolyzed polyacrylamide as a shale stabilizer and secondarily as a viscosifying agent. Blast furnace slag, while compatible, tends to reduce the function of the partially hydrolyzed polyacrylamide, thus resulting in the partial waste of an ingredient. Also, in systems not employing lime, blast furnace slag tends to reduce fluid loss control. These adverse effects are probably the result of the calcium level, and the pH imparted by the blast furnace slag which adversely impacts the most common shale stabilizer, partially hydrolyzed polyacrylamide and adversely affects fluid loss control. The calcium and high pH flocs the solids in non-lime systems and thus good filter cake quality is not produced. Thus, the use of a lime based system provides the optimum base fluid for implementation of blast furnace slag in a universal fluid. Silicate muds also give advantages with blast furnace slag similar to those obtained with lime muds.

Activation

The drilling can be carried out for any period of time desired with the same drilling fluid (augmented with fresh fluid to compensate for loss and increased hole depth) without the blast furnace slag setting. For instance, the drilling can be carried out for one day or up to any time needed, generally between greater than one day and 100 days. Then on activation, the blast furnace slag will set to give its full potential of compressive strength.

In its simplest form, activation may occur simply through an increase in temperature. For instance, during drilling the circulation of the drilling fluid has as one of its functions the carrying off of generated heat and any heat from the formation. Thus, during the drilling the retarders in the drilling fluid (polyalcohol and optional retarder ingredients inhibit hydration of the blast furnace slag as does the circulation itself. On cessation of drilling and displacement of the drilling fluids selectively into the area to be cemented, the temperature will rise in those systems where the circulation was carrying off heat from the formation to a degree sufficient to set the cementitious slurry.

In most instances, however, an activator system will be added to the drilling fluid between the drilling operation and the cementing operation. The activator system can be simply additional blast furnace slag and, in any event, additional blast furnace slag will generally be incorporated. Also, other ingredients which are, or which may be, present in the drilling fluid and which have an accelerator function can be added in additional quantities between the drilling and the cementing. For instance, if the drilling fluid has silicate such as sodium silicate, additional silicate can be added or if it has lime, i.e., is a lime mud, additional lime can be added.

Suitable activators which are generally not a part of the drilling fluid, but are added between the drilling operation and the cementing operation, include lithium hydroxide, lithium carbonate, sodium silicate, sodium fluoride, sodium silicofluoride, magnesium hydroxide, magnesium oxide, magnesium silicofluoride, zinc carbonate, zinc silicofluoride, zinc oxide, sodium carbonate, sodium bicarbonate, titanium carbonate, potassium carbonate, potassium bicarbonate, sodium hydroxide, potassium hydroxide, potassium sulfate, potassium nitrite, potassium nitrate, sodium or potassium aluminate, calcium hydroxide, sodium sulfate, copper sulfate, calcium oxide, calcium sulfate, calcium nitrate, calcium nitrite, and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. Generally, 2 to 70 lbs/bbl of total activator is used. The references to "lbs/bbl" means pounds per barrel of final cementitious slurry.

In some instances, it may be desirable to use a material for a particular effect along with the activator even though it may also act as a retarder. For instance, a chromium lignosulfonate may be used as a thinner in the cementitious slurry along with the activator even though it also functions as a retarder.

Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, phenol sulfonate, dodecylbenzene sulfonate, sulfomethylated tree extract, stearyl amine and lauryl amine surfactants, sulfonated styrene-toluene copolymers, and mixtures thereof.

In accordance with this invention the drilling process is carried out as described hereinabove with the universal fluid to produce a borehole through a plurality of strata, thus laying down a filter cake. Because the filter cake comprises blast furnace slag, it will eventually hydrate with time to produce a solid. This hydration is further accelerated by migration of activators from the cementitious slurry when it is displaced into the annulus between a pipe and the borehole wall on which the filter cake is laid down. Furthermore, because the cementitious slurry is compatible with the drilling fluid, a good bond will be obtained between the cementitious slurry and the borehole wall. Further, the cementitious slurry is compatible with any mud which is not removed during displacement. Thus:

a) drilling filter cake deposited while drilling through permeable zones will be converted into an effective sealant;

b) whole mud that has not been removed from washed out sections of the hole during displacement will harden with time and, therefore, provide an effective sealant and lateral support to the casing.

Filter Cake Setting

In yet another embodiment of this invention the drilling process is carried out as described hereinabove with the universal fluid to produce the borehole through a plurality of strata thus laying down the filter cake. Prior to the cementing operation, an activator is passed into contact with the filter cake, for instance by displacing out the drilling fluid and circulating a fluid containing the activator down the drill string and up the annulus between the drill string and the filter cake, or else the drill string is removed and the casing inserted and the activator circulated down the casing and up the annulus (or down the annulus and up the drill string or casing). Preferably, the circulation is carried out by using the drill string, this being one benefit of this embodiment of the invention whereby the filter cake can be "set" to shut off gas zones, water loss, or to shut off lost circulation in order to keep drilling without having to remove the drill string and set another string of casing. Alternatively, the activator can be added to the drilling fluid instead of using a separate fluid. This filter cake setting can also be used to stabilize zones which may be easily washed-out (salt zones wherein the salt is soluble in water, for instance) or other unstable zones. After the drilling is complete, the drill string is removed, and the cementing carried out.

Conventional spacers may be used in the above described sequence. Also, any leftover fluid having activators therein may be displaced out of the borehole by the next fluid and/or a spacer fluid and stored for subsequent use or disposal.

In this embodiment where the filter cake is "set", the activator can be any of the alkaline activators referred to hereinabove such as a mixture of sodium hydroxide and sodium carbonate.

Lime

As previously noted, preferred systems contain lime. These systems thus are analogous to conventional drilling fluids known as high lime, low lime, and low lime/salt/alcohol. By "low lime" is meant a drilling fluid having about 0.5 to 3, generally 0.5 to 2.0 lbs of unreacted lime per barrel of drilling fluid. By "high lime" is meant a drilling fluid having from greater than 3.0 to 15 lbs of unreacted lime per barrel of drilling fluid. The low lime/salt/alcohol fluids have about 1 to 4.0 lbs/bbl of unreacted lime, about 18 to 109 lbs/bbl of salt such as sodium chloride, and about 1 to 168 lbs/bbl, preferably 10 to 80 lbs/bbl, more preferably 15 to 55 lbs/bbl, most preferably 40 to 60 lbs/bbl of a polyhydric alcohol per barrel of drilling fluid.

Ingredient Ratios

Blast furnace slag is present in the drilling fluid (universal fluid) in an amount within the range of about 1 to about 100 lbs/bbl of final drilling fluid, preferably 10 to 80 lbs/bbl, most preferably 20 to 50 lbs/bbl. As noted above, additional blast furnace slag is generally added between the drilling operation and the cementing operation to give a total concentration of blast furnace slag in the cementitious slurry within the range of from about 20 to 600 lbs/bbl, preferably 100 to 500 lbs/bbl, most preferably 150 to 300 lbs/bbl.

The silicate, if used, is generally present in an amount within the range of 1-100, preferably 2-15, most preferably 5-10 lbs/bbl based on barrels of drilling fluid.

The concentration of the polyalcohol in the water phase of the universal fluid of this invention will generally be 1-50% by volume and preferably from about 3 to 30% by volume based on the volume of water, more preferably from 5 to 25% by volume, most preferably between 10 and 20% by volume. The soluble:insoluble polyols can be used in weight ratios of 10:1 to 1:10, preferably 1:2 to 1:8, more preferably about 1:4 soluble:insoluble.

Dilution

Another feature of this invention is the ability to tailor the rheology of both the drilling fluid and the final cement to the conditions of a particular wellbore. This results in part from the fact that the use of slag as the hydraulic material gives a final cementitious slurry which is not weakened in the manner that would be the case with Portland cement if the slurry is more dilute. On the other hand, additional slag does not impart extremely high viscosity to the slurry and thus a higher concentration of hydraulic material can be used if desired.

However, in the preferred method of this invention, the drilling fluid is utilized and thereafter diluted prior to or during the addition of additional blast furnace slag. The dilution fluid can be the same as the liquid used to make the drilling fluid or it can be different. Generally, it will be brine, especially if the drilling fluid was made using brine. It can also be a more concentrated brine. In many instances, it is preferred that both the dilution fluid and the original liquid used to produce the initial drilling fluid be seawater. This is especially beneficial in offshore drilling applications where fresh water is not readily available and seawater is.

Thus, a significant improvement in the operating procedure is provided. This is because the density of the drilling fluid can be chosen in the first place to be sufficient to avoid inflow into the wellbore because of formation pressure but insufficient to rupture the wellbore wall and force fluid out into the formation. By utilizing the dilution and thereafter the addition of additional blast furnace slag, the cementitious slurry can also have the density tailored to the particular operation the same as the drilling fluid.

The dilution can be carried out in either of two ways. First, a vessel containing drilling fluid can simply be isolated and the desired amount of water or other diluent added thereto. In a preferred embodiment, however, the drilling fluid is passed to a mixing zone as a flowing stream and the diluent added to the flowing stream. Thereafter, the additional blast furnace slag is added. This avoids highly viscous cementitious slurry compositions and allows all of the pumping to be done with piping and pumps associated with the well rig without the need for pumps designed for pumping cement. This is of particular value in the areas to which this invention is of special utility, offshore drilling rigs where the transportation of additional pumping equipment is particularly inconvenient. Thus, it is possible to tailor the final density of the cementitious slurry, if desired, to a value within the range of 30% less to 70% more than the original density of the drilling fluid, preferably within the range of 15% less to 50% more, most preferably essentially the same, i.e., varying by no more than ±5 weight percent.

Displacement

Conventional displacement techniques can be used to displace the universal fluid of this invention with the cementitious slurry. However, because of the inherent compatibility of the drilling fluid and the cementitious slurry, wiper plugs and spacer fluids can be omitted. Thus the cementitious slurry can be placed in direct fluid contact with the drilling fluid and the drilling fluid displaced out of the annulus between a pipe being cemented and a surrounding wall. The cement is, in turn, displaced to a preselected location in the annulus by direct fluid contact with a displacement fluid such as seawater or drilling fluid.

Generally, this involves introducing a cementitious slurry into a casing or liner followed by the displacement fluid and displacing the cementitious slurry down the casing or liner and back up into the annulus surrounding the casing or liner.

EXAMPLE 1

This example is presented to show the drilling fluid characteristics and cementitious characteristics of compositions in accordance with the invention.

ence to cake thickness represents the high pressure high temperature filter cake thickness.

As can be seen from the rheology data, particularly the low plastic viscosity numbers, all three of the compositions described have good drilling fluid characteristics so far as rheology is concerned. The high pressure high temperature fluid loss data show that they all have good drilling fluid characteristics from this very important standpoint. The 60-hour compressive strength data shows that with as little as 40 lbs/bbl of blast furnace

| | DATA FOR 11.5 ppg MUDS | | | | | | | | |
|---|---|---|---|---|---|---|---|---|---|
| | SLNP | SENP | SNP | SLNP | SENP | SNP | SLNP | SENP | SNP |
| Density 11.5 lb/gal | | | | | | | | | |
| 23% NaCl brine (bbl) | 0.8 | 0.8 | 0.8 | 0.8 | 0.8 | 0.8 | 0.8 | 0.8 | 0.8 |
| Lime (lb/bbl) | 4 | — | — | 4 | — | — | 4 | — | — |
| "NEWCEM[1]" (lb/bbl) | 60 | 60 | 60 | 40 | 40 | 40 | 30 | 30 | 30 |
| "MOR-REX[2]" (lb/bbl) | 4 | 4 | 4 | 4 | 4 | 4 | 4 | 4 | 4 |
| Starch (lb/bbl) | 6 | 6 | 6 | 6 | 6 | 6 | 6 | 6 | 6 |
| "POLYDRILL[3]" (lb/bbl) | 6 | 6 | 6 | 6 | 6 | 6 | 6 | 6 | 6 |
| "FILTREX[4]" (lb/bbl) | — | — | — | — | — | — | — | — | — |
| Silicate (lb/bbl) | — | 5 | — | — | 5 | — | — | 5 | — |
| Bentonite (lb/bbl) | 20 | 20 | 20 | 20 | 20 | 20 | 20 | 20 | 20 |
| "REVDUST[5]" (lb/bbl) | 25 | 25 | 25 | 25 | 25 | 25 | 25 | 25 | 25 |
| "BIOZAN[6]" (lb/bbl) | 0.5 | — | 0.4 | 0.5 | — | 0.4 | 0.5 | — | 0.4 |
| Barite (lb/bbl) | 71 | 71 | 71 | 71 | 71 | 71 | 71 | 71 | 71 |
| PECP[7] (lb/bbl) | 36 | 36 | 36 | 36 | 36 | 36 | 36 | 36 | 36 |
| 16 hours Hot Roll | | | | | | | | | |
| 600 rpm | 50[1A] | 71 | 49 | 51 | 71 | 49 | — | — | — |
| 300 rpm | 29 | 40 | 28 | 31 | 41 | 29 | — | — | — |
| 200 rpm | 21 | 30 | 21 | 20 | 31 | 20 | — | — | — |
| 100 rpm | 13 | 18 | 14 | 12 | 18 | 13 | — | — | — |
| 6 rpm | 3 | 6 | 3 | 3 | 5 | 3 | — | — | — |
| 3 rpm | 2 | 5 | 3 | 2 | 5 | 2 | — | — | — |
| Plastic Viscosity (cp) | 21 | 31 | 21 | 20 | 30 | 20 | — | — | — |
| Yield Point (lb/100 ft$^2$) | 8 | 9 | 7 | 11 | 11 | 9 | — | — | — |
| Gel Strength-10 second | 3 | 4 | 2 | 3 | 3 | 1 | — | — | — |
| Gel Strength-10 minute | 6 | 8 | 5 | 7 | 9 | 5 | — | — | — |
| HPHT[8] (mls) | 7.8 | 6.8 | 8.4 | 8.6 | 8 | 8.6 | — | — | — |
| HPHT (cake thickness, 32nd inch) | 3 | 3 | 3 | 3 | 3 | 3 | — | — | — |
| 60 hours-Axial Compressive Strength (psi) | 123 | 105 | 95 | 47 | 38 | 30 | 12 | 8 | 5 |
| 650 hours-Density (11.5 ppg) | | | | | | | | | |
| 600 rpm | 46[1B] | 64 | 52 | 44 | 61 | 50 | — | — | — |
| 300 rpm | 26 | 35 | 28 | 25 | 33 | 30 | — | — | — |
| 200 rpm | 17 | 25 | 21 | 18 | 24 | 19 | — | — | — |
| 100 rpm | 9 | 15 | 12 | 10 | 13 | 12 | — | — | — |
| 6 rpm | 2 | 3 | 3 | 2 | 3 | 2 | — | — | — |
| 3 rpm | 1 | 2 | 2 | 1 | 2 | 2 | — | — | — |
| Plastic Viscosity (cp) | 20 | 29 | 24 | 19 | 28 | 20 | — | — | — |
| Yield Point (lb/100 ft$^2$) | 6 | 6 | 4 | 6 | 5 | 10 | — | — | — |
| Gel Strength-10 second | 2 | 3 | 1 | 2 | 3 | 2 | — | — | — |
| Gel Strength-10 minute | 3 | 6 | 4 | 4 | 5 | 5 | — | — | — |
| HPHT (mls) | 11.5 | 10.6 | 9.6 | 9.8 | 11 | 10.5 | — | — | — |
| HPHT (cake thickness, 32nd inch) | 3 | 3 | 3 | 3 | 3 | 3 | — | — | — |
| 60 hours-Axial Compressive Strength (psi) | 131 | 102 | 90 | 51 | 42 | 32 | 12 | 8 | 5 |

[1]Trade name of Blue Circle Cement Co. for blast furnace slag having a Blaine specific surface area of about 5,500 cm$^2$/g
[2]Trade name of Grain Processing Company for a water soluble carbohydrate polymer
[3]Trade name of SKW Chemicals, Inc. for a synthetic polymer
[4]Trade name of Milpark for polyionic lignin resin
[5]Trade name of clay/quartz dust manufactured by Milwhite Corporation
[6]Trade name of Kelco Oil Field Group Inc. for welan gum biopolymer, described in more detail in U.S. Pat. No. 4,342,866, the disclosure of which is hereby incorporated by reference
[7]Polycyclicpolyetherpolyol
[8]High pressure, high temperature
[1A]Viscosity reading from Fann 35 viscometer at indicated rpm after the hot rolling 120° F.
[1B]Viscosity reading from Fann 35 viscometer at indicated rpm after 650 hours rolling 150° F.

In this Example "S" represents salt (NaCl), "L" represents lime; "N" represents blast furnace slag; "P" represents polyalcohol, specifically a polycyclicpolyetherpolyol; and "E" represents sodium silicate. The designation "HPHT (mls)" represents high pressure high temperature fluid loss. The corresponding referslag the drilling fluid itself has sufficient strength on setting to provide some lateral support to the casing or liner. This is significant in that filter cake will harden and provide better seal. It is also significant in that if an insufficient amount of cementitious slurry is introduced during primary cementing, any drilling fluid in an annulus to be cemented will eventually set and provide some lateral support. This is quite significant. Even if no error is made in calculating the amount of cementitious slurry needed, an insufficient amount may still be introduced because of the unknown amounts that may be lost to wash-outs in the formation or otherwise lost. The 650 hour data show the system lasted for a long time as a drilling fluid and thereafter was still capable of being converted to a set cement.

EXAMPLE 2

The following example shows the same good results with a higher density drilling fluid made in accordance with the invention. The viscosity data is from a Fann 35 viscometer as in Example 1.

| | DATA FOR 14.0 ppg MUDS | | | | | | | | | | | |
|---|---|---|---|---|---|---|---|---|---|---|---|---|
| | SLNP | SLNP | SENP | SNP | SLNP | SLNP | SENP | SNP | SLNP | SLNP | SENP | SNP |
| 23% NaCl brine (bbl) | 0.73 | 0.73 | 0.73 | 0.73 | 0.73 | 0.73 | 0.73 | 0.73 | 0.73 | 0.73 | 0.73 | 0.73 |
| Lime (lb/bbl) | 4 | 4 | — | — | 4 | 4 | — | — | 4 | 4 | — | — |
| "NEWCEM[1]" (lb/bbl) | 60 | 60 | 60 | 60 | 40 | 40 | 40 | 40 | 20 | 20 | 20 | 20 |
| "MOR-REX[2]" (lb/bbl) | 4 | 4 | 4 | 4 | 4 | 4 | 4 | 4 | 4 | 4 | 4 | 4 |
| Starch (lb/bbl) | 6 | 6 | 6 | 6 | 6 | 6 | 6 | 6 | 6 | 6 | 6 | 6 |
| "POLYDRILL[3]" (lb/bbl) | 6 | — | 6 | 6 | 6 | — | 6 | 6 | 6 | — | 6 | 6 |
| "FILTREX[4]" (lb/bbl) | — | 6 | — | — | — | 6 | — | — | — | 6 | — | — |
| Silicate (lb/bbl) | — | — | 5 | — | — | — | 5 | — | — | — | 5 | — |
| Bentonite (lb/bbl) | 20 | 20 | 20 | 20 | 20 | 20 | 20 | 20 | 20 | 20 | 20 | 20 |
| "REVDUST[5]" (lb/bbl) | 25 | 25 | 25 | 25 | 25 | 25 | 25 | 25 | 25 | 25 | 25 | 25 |
| "BIOZAN[6]" (lb/bbl) | 0.5 | 0.75 | — | 0.4 | 0.5 | 0.75 | — | 0.5 | 0.5 | | — | 0.5 |
| Barite (lb/bbl) | 216 | 216 | 216 | 216 | 216 | 216 | 216 | 216 | 216 | 216 | 216 | 216 |
| PECP[7] (lb/bbl) | 32 | 32 | 32 | 32 | 32 | 32 | 32 | 32 | 32 | 32 | 32 | 32 |
| 16 hours Hot Roll (Density 14 ppg) | | | | | | | | | | | | |
| 600 rpm | 50 | 61 | 105 | 132 | 48 | 58 | 111 | 140 | 46 | 57 | 106 | 135 |
| 300 rpm | 29 | 36 | 63 | 81 | 27 | 35 | 66 | 87 | 25 | 33 | 65 | 85 |
| 200 rpm | 21 | 27 | 46 | 62 | 20 | 25 | 48 | 66 | 19 | 24 | 46 | 65 |
| 100 rpm | 13 | 16 | 31 | 38 | 12 | 15 | 30 | 42 | 11 | 14 | 28 | 41 |
| 6 rpm | 3 | 5 | 7 | 11 | 1 | 4 | 9 | 15 | 1 | 2 | 8 | 13 |
| 3 rpm | 2 | 3 | 6 | 4 | 2 | 3 | 8 | 5 | 1 | 2 | 7 | 4 |
| Plastic Viscosity (cp) | 21 | 25 | 42 | 51 | 21 | 23 | 45 | 53 | 21 | 24 | 41 | 50 |
| Yield Point (lb/100 ft$^2$) | 8 | 11 | 21 | 30 | 6 | 12 | 21 | 34 | 4 | 9 | 24 | 35 |
| Gel Strength-10 second | 3 | 5 | 4 | 5 | 4 | 6 | 8 | 6 | 3 | 5 | 8 | 6 |
| Gel Strength-10 minute | 6 | 11 | 13 | 14 | 7 | 12 | 18 | 16 | 7 | 11 | 16 | 14 |
| HPHT[8] (mls) | 2.4 | 6.2 | 9.2 | 4 | 2.4 | 6.2 | 9.2 | 4 | 7.9 | 9 | 8.7 | 8.5 |
| HPHT (cake thickness, 32nd inch) | 3 | 3 | 3 | 3 | 3 | 3 | 3 | 3 | 3 | 3 | 3 | 3 |
| 60 hours-Axial Compressive Strength (psi) | 250 | 274 | 220 | 145 | 132 | 115 | 87 | 76 | 47 | 43 | 13 | 10 |
| 650 hours-Density (14 ppg) | | | | | | | | | | | | |
| 600 rpm | 47 | 55 | 70 | 117 | 45 | 51 | 63 | 92 | 43 | 50 | 58 | 87 |
| 300 rpm | 26 | 30 | 38 | 66 | 24 | 29 | 34 | 53 | 22 | 27 | 33 | 51 |
| 200 rpm | 18 | 21 | 28 | 47 | 17 | 19 | 24 | 39 | 16 | 18 | 22 | 38 |
| 100 rpm | 10 | 12 | 15 | 28 | 9 | 10 | 13 | 23 | 8 | 9 | 11 | 22 |
| 6 rpm | 2 | 3 | 3 | 8 | 2 | 4 | 2 | 10 | 3 | 4 | 3 | 8 |
| 3 rpm | 1 | 2 | 2 | 4 | 1 | 3 | 1 | 5 | 4 | 2 | 1 | 4 |
| Plastic Viscosity (cp) | 21 | 25 | 32 | 51 | 21 | 22 | 29 | 39 | 21 | 23 | 25 | 36 |
| Yield Point (lb/100 ft$^2$) | 5 | 5 | 6 | 15 | 3 | 7 | 5 | 14 | 1 | 4 | 8 | 15 |
| Gel Strength-10 second | 2 | 2 | 3 | 0.8 | 2 | 3 | 2 | 3 | 2 | 3 | 2 | 4 |
| Gel Strength-10 minute | 3 | 7 | 6 | 13 | 3 | 8 | 4 | 12 | 4 | 5 | 3 | 9 |
| HPHT (mls) | 8.9 | 9.4 | 9.4 | 10.5 | 10 | 9.6 | 9.2 | 8.8 | 9.8 | 8.4 | 9.4 | 11 |
| HPHT (cake thickness, 32nd inch) | 3 | 3 | 3 | 3 | 3 | 3 | 3 | 3 | 3 | 3 | 3 | 3 |
| 60 hours-Axial Compressive Strength (psi) | 286 | 245 | 211 | 162 | 127 | 121 | 88 | 81 | 42 | 53 | 15 | 10 |

[1]Trade name of Blue Circle Cement Co. for blast furnace slag having a Blaine specific surface area of about 5,500 cm$^2$/g
[2]Trade name of Grain Processing Company for a water soluble carbohydrate polymer
[3]Trade name of SKW Chemicals, Inc. for a synthetic polymer
[4]Trade name of Milpark for polyanionic lignin resin
[5]Trade name of clay/quartz dust manufactured by Milwhite Corporation
[6]Trade name of Kelco Oil Field Group Inc. for welan gum bipolymer, described in more detail in U.S. Pat. No. 4,342,866, the disclosure of which is hereby incorporated by reference
[7]Polycyclicpolyetherpolyol
[8]High pressure, high temperature

EXAMPLE 3

This Example is presented to correlate the amount of blast furnace slag in a universal drilling fluid with strength development when an activator is utilized (as would occur from migration of the activator from a blast furnace slag cementitious slurry or from the circulation of an activator or from the circulation of an activator-containing drilling fluid prior to the introduction of the cementitious slurry). The results are shown for three of the systems of the type set out in Examples 1 and 2, namely, SNP, SENP (lime being part of the activator system) and SLNP.

EXAMPLE 3

Salt/NewCem/PECP = SNP
Salt/Econolite/NewCem/PECP = SENP
Salt/Lime/NewCem/PECP = SLNP
Axial Compressive Strength

| 14 ppg | NEWCEM[1] (lb/bbl) | 12 (150° F.) | 24 (150° F.) | 48 (150° F.) | 330 (75°) |
|---|---|---|---|---|---|
| Salt/"NEWCEM"/PECP[2] | 10 | 0 | 0 | 0 | — |
| with Soda Ash (5 lb/bbl) | 10 | 0 | 0 | 0 | — |
| NaOH (10 lb/bbl) | 20 | 0 | 5 | 9 | — |
|  | 20 | 0 | 5 | 10 | — |
|  | 30 | 5 | 25 | 37 | — |
|  | 30 | 5 | 24 | 36 | — |
|  | 40 | 10 | 45 | 62 | 76 |
|  | 40 | 14 | 57 | 77 | 80 |
|  | 60 | 32 | 113 | 145 | 162 |
|  | 60 | 36 | 125 | 160 | 175 |
| Salt/"ECONOLITE[3]"/ | 10 | 0 | 0 | 0 | — |
| "NEWCEM"/PECP with | 10 | 0 | 0 | 0 | — |
| Lime (5 lb/bbl) | 20 | 0 | 6 | 11 | — |
| NaOH (10 lb/bbl) | 20 | 0 | 6 | 12 | — |
|  | 30 | 7 | 32 | 46 | — |
|  | 30 | 7 | 33 | 48 | — |
|  | 40 | 14 | 32 | 84 | 82 |
|  | 40 | 12 | 33 | 89 | 71 |
|  | 60 | 47 | 156 | 196 | 184 |
|  | 60 | 50 | 164 | 205 | 201 |
| Salt/Lime/"NEWCEM"/PECP | 10 | 0 | 3 | 8 | — |
| with Soda Ash (5 lb/bbl) | 10 | 0 | 3 | 7 | — |
| NaOH (10 lb/bbl) | 20 | 6 | 23 | 47 | — |
|  | 20 | 5 | 18 | 38 | — |
|  | 30 | 15 | 44 | 84 | — |
|  | 30 | 17 | 50 | 92 | — |
|  | 40 | 24 | 69 | 123 | 132 |
|  | 40 | 26 | 75 | 132 | 134 |
|  | 60 | 53 | 136 | 226 | 251 |
|  | 60 | 55 | 139 | 230 | 223 |

Trade name of Blue Circle Cement Co. for blast furnace slag having a Blaine specific surface area of about 5,500 cm$^2$/g
[2]Trade name of Grain Processing Company for a water soluble carbohydrate polymer
[3]Trade name of Halliburton for sodium silicate The data show two things. First, it is shown that with an activator, some axial compressive strength is attained even at room temperature. This shows that the drilling mud itself can provide support to a casing or liner if insufficient cementitious slurry is introduced due to loss from wash-outs or other unforeseen causes. Second, it shows that a minimum of 30 to 60 lbs of blast furnace slag per barrel of universal drilling fluid is necessary to give good results, although in fact the effect in actual use is more dramatic because even at lower concentrations, the blast furnace slag is concentrated in the filter cake and activators can easily migrate into it or be circulated into contact with it.

EXAMPLE 4

In this Example, shale cuttings having a size of 10 mesh are put in a roll mill with a liquid having the ingredients listed in the heading of each column. For example, in the first column, the 10 mesh shale is rolled for the indicated time at 150° F. At each time indicated an aliquot is taken and the percent of shale that will still be retained on a 10 mesh screen is indicated. The last row shows the results of taking a portion of the 110 aliquot and rolling it for 8 hours in fresh water (a stringent test of the degree of shale stabilization).

| Hot Rolling Dispersion Tests | | | | | | | | | | |
|---|---|---|---|---|---|---|---|---|---|---|
|  | 1 Control | 2 PHPA | 3 PHPA/N | 4 SLP | 5 SLNP | 6 SENP | 7 SNP | 8 SLNP | 9 SENP | 10 SNP |
| 23% NaCl brine (bbl) | 0.73 | 0.73 | 0.73 | 0.73 | 0.73 | 0.73 | 0.73 | 0.73 | 0.73 | 0.73 |
| Lime (lbs/bbl) | — | — | — | 4 | 4 | — | — | 4 | — | — |
| "NEWCEM[1]" (lbs/bbl) | — | — | 40 | — | 40 | 40 | 40 | 20 | 20 | 20 |
| Silicate (lbs/bbl) | — | — | — | — | — | 5 | — | — | — | — |
| "PECP[2]" (lbs/bbl) | — | — | — | 32 | 32 | 32 | 32 | 32 | 32 | 32 |
| PHPA[3] | — | 0.15 | 0.15 | — | — | — | — | — | — | — |
| Rolling Time (Hours) | | | | 10 Mesh Shale Cuttings | | | | | | |
| 25 | 61.4 | 78.9 | 80.4 | 97.4 | 94.7 | 86.9 | 93.4 | 93.5 | 86 | 92.2 |
| 50 | 25.6 | 59.7 | 71.2 | 94.7 | 91.1 | 76.2 | 88.2 | 89.9 | 75.6 | 86.3 |
| 110 | 8.4 | 29.7 | 42.1 | 90.4 | 82.9 | 43.3 | 77.4 | 81.2 | 42.1 | 76.2 |
| 167 | 3.2 | 13.4 | 26.6 | 84.4 | 78.9 | 25.6 | 73.3 | 77.6 | 25 | 71.4 |
| 196 | 0.5 | 8.8 | 16.8 | 83.4 | 77.4 | 19.4 | 70.1 | 73.1 | 19.4 | 68.4 |
| 263 | 0 | 3.6 | 11.2 | 82.4 | 76.6 | 16.8 | 67.1 | 74.5 | 14.8 | 64.8 |
| 8 Hr Fresh Water | 0 | 0 | 0 | 86.4 | 76.6 | 34.5 | 68.5 | — | — | — |

| Hot Rolling Dispersion Tests |
|---|
| After 110 Hours |

[1] Trade name of Blue Circle Cement Co. for blast furnace slag having a Blaine specific surface area of about 5,500 $cm^2/g$
[2] Trade name of Grain Processing Company for a water soluble carbohydrate polymer
[3] Partially hydrolyzed polyacrylamide As can be seen, a drilling fluid made up of only salt and water (column 1) gives so little stabilization that after 263 hours none of the shale is left intact. With PHPA, the industry standard drilling fluid shale stabilizer, only 3.6 percent is intact (column 2) and, as shown in Column 10, after 8 hours of hot rolling in fresh water at 150° F., it is believed none remains although it was not measured. Fresh water is a good test medium for shale stability since fresh water is more active in destabilizing shale than is salt water. Column 3 shows that PHPA is also ineffective in the presence of blast furnace slag. Columns 5-10 show that all of the compositions used in this invention are effective shale stabilizers even under the very severe conditions of these tests; all had at least some shale intact even after 263 hours. Also in the three invention compositions tested (columns 5-7) a significant amount of shale survived both the 110 hours hot rolling and the 8 hours in fresh water. The comparison run of column 4 simply shows that the beneficial effects of blast furnace slag (settable filter cake, for instance) can be obtained without destroying the shale stabilizing effect of the polyalcohol.

In the following second part of this Example, the compositions of columns 1-7 (labeled here 3-9) and two additional compositions were contacted with Pierre test cores at 150° F for 185 hours. The results were as follows:

|  | 1 Native[1] | 2 NaCl | 3 Control | 4 PHPA | 5 PHPA/N | 6 SLP | 7 SLNP | 8 SENP | 9 SNP |
|---|---|---|---|---|---|---|---|---|---|
| NaOH, lbs/bbl | — | 4 | 0 | 4 | 4 | 4 | 4 | 4 | 4 |
| Universal Compressive Strength, psi | 633 | 864 | 655 | 604 | 611 | 1236 | 1289 | 1025 | 1358 |

[1] "Native" means untreated core.

This data shows a remarkable improvement in Pierre test cores in accordance with the invention (Runs 7-9) compared with the industry standard shale stabilizer, PHPA (Run 4).

EXAMPLE 5

This Example shows the effect of using a mixture of soluble and insoluble alcohols. The soluble alcohol is a polycyclicpolyetherpolyol of the type shown herein, wherein average x=2.0 and average y=5.0. The insoluble alcohol is a poly(propylene glycol) of high enough molecular weight to be insoluble. It is a material sold by Dow Chemical under the trade name "PG 4000".

The base mud with which the listed composition was combined was as follows:
20 lbs/bbl bentonite gel
25 lbs/bbl drill solids[1]
3 lbs/bbl starch
4 lbs/bbl synthetic polymer[2]
3 lbs/bbl "MOR-REX[3]"
0.5 lbs/bbl "BIOZAN[4]"

[1] Clay/quartz dust manufactured by MilWhite Corp. under the trade name "REVDUST". [2] Manufactured by SKW Chemicals Inc. under the trade name "POLYDRILL" [3] Trade name of Grain Processing Co. for water soluble carbohydrate polymer [4] Trade of Kelco Oil Field Group Inc. for a biopolymer The salt in each instance was used in an amount of 20 wt % based on the weight of the continuous phase. The lime was used in an amount of 4 lbs/bbl of drilling fluid.

| Mud Additive System | Percent[1] Alcohol | HPHT[2] (mls) | Predicted Additive Response (mls) | Actual Response (mls) | Percent Increase |
|---|---|---|---|---|---|
| Salt/Lime Control | 0 | 14 | | | |
| Salt/Lime Polypropylene Glycol | 14.9 | 12 | | | |
| Salt/Lime PECP | 6.7 | 10.8 | | | |
| Salt/Lime/PECP/PG | 6.7/14.9 | 5.6 | 8.8 | 5.6 | 57.1 |
| + 40 lb/bbl Slag Salt/Lime Control | 0 | 16 | | | |
| Salt/Lime Polypropylene Glycol | 14.9 | 14.2 | | | |
| Salt/Lime PECP | 6.7 | 11.5 | | | |
| Salt/Lime/PECP/PG | 6.7/14.9 | 8.7 | 9.7 | 8.7 | 11.5 |
| + 40 lb/bbl Slag Salt/Lime Control | 0 | 15 | | | |
| Salt/Lime Polypropylene Glycol | 8.75 | 15.5 | | | |
| Salt/Lime PECP | 8.75 | 9 | | | |
| Salt/Lime/PECP/PG | 8.75/8.75 | 8.1 | 9.5 | 8.1 | 17.3 |

[1] Weight percent based on the weight of the continuous (fluid) phase.
[2] High temperature, high pressure fluid loss at 20° F. and 500 psi pressure differential.

As can be seen, the composition comprising soluble and insoluble alcohols (PECP/PG) gave better results than would have been predicted from the additive effects of each alone.

While this invention has been described in detail for the purpose of illustration, it is not to be construed as limited thereby but is intended to cover all changes and modifications within the spirit and scope thereof.

What is claimed is:

1. A method for drilling and cementing, comprising:
   drilling a wellbore with a drill string comprising a drill pipe utilizing a drilling fluid comprising water, blast furnace slag and a polyalcohol component;
   circulating said drilling fluid down said drill pipe and up an annulus between said drill pipe and walls of said borehole, thus laying down a filter cake on said walls of said borehole during said drilling and producing a used drilling fluid;
   withdrawing said drill string and inserting a pipe, thus creating an annulus between said pipe and said walls of said borehole;
   incorporating an activator system into said used drilling fluid to produce a cementitious slurry; and
   displacing said cementitious slurry into at least a portion of said annulus between said pipe and said walls of said borehole.

2. A method according to claim 1 wherein said activator system comprises at least one of lithium hydroxide, lithium carbonate, sodium silicate, sodium fluoride, sodium silicofluoride, magnesium hydroxide, magnesium oxide, magnesium silicofluoride, zinc carbonate, zinc silicofluoride, zinc oxide, sodium carbonate, sodium bicarbonate, titanium carbonate, potassium carbonate, potassium carbonate, sodium hydroxide, potassium hydroxide, potassium sulfate, potassium nitrate, sodium or potassium aluminate, potassium nitrite, calcium hydroxide, sodium sulfate, copper sulfate, calcium oxide, calcium sulfate, calcium nitrate and calcium nitrite.

3. A method according to claim 1 wherein said cementitious slurry is produced by also incorporating a solid component selected from pozzolan or Portland cement into said used drilling fluid.

4. A method according claim 3 wherein said solid component is Portland cement.

5. A method according to claim 3 wherein said solid component is fly ash.

6. A method according to claim 3 wherein said solid component is incorporated in an amount within the range of 1 to 100 percent by weight based on the weight of blast furnace slag in said used drilling fluid.

7. A method according to claim 1 wherein said activator system comprises additional blast furnace slag and a mixture of sodium hydroxide and sodium carbonate.

8. A method according to claim 1 wherein said activator system comprises a mixture of 2 to 6 lbs/bbl of sodium hydroxide in conjunction with 7 to 21 lbs/bbl of sodium carbonate and wherein additional blast furnace slag is added in addition to said sodium hydroxide and sodium carbonate so as to give a total blase furnace slag concentration in said cementitious slurry within the range of 100 to 300 lbs/bbl.

9. A method according to claim 1 wherein, after said circulating of said drilling fluid, said drilling fluid is displaced and a fluid containing an activator system circulated through said annulus between said drill pipe and said borehole wall to set said filter cake;
   thereafter said fluid containing said activator system is displaced with drilling fluid; and
   additional drilling is carried out prior to said withdrawing of said drill string.

10. A method according to claim 1 wherein said drilling fluid contains lime and partially hydrolyzed polyacrylamide.

11. A method according to claim 1 wherein said drilling fluid contains no partially hydrolyzed polyacrylamide.

12. A method according to claim 1 wherein said polyalcohol component comprises an ethoxylated propoxylated polyol.

13. A method according to claim 1 wherein said drilling fluid comprises in addition, a viscosifier selected from the group consisting of biopolymers, silicates and starch.

14. A method according to claim 13 wherein said viscosifier comprises starch.

15. A method according to claim 14 wherein said viscosifier comprises a biopolymer, said drilling fluid comprises, in addition, lime, and wherein said biopolymer is added after said lime.

16. A method according to claim 13 wherein said viscosifier comprises sodium silicate.

17. A method according to claim 1 wherein said drilling fluid comprises, in addition, a secondary fluid loss additive, a secondary weight material, a secondary shale stabilizer, and a biopolymer viscosifier.

18. A method according to claim 17 wherein said secondary fluid loss additive is selected from the group consisting of synthetic polymers, starch and bentonite clay, said secondary weight material is barite and said secondary shale stabilizer is selected from the group consisting of sodium silicate and lime.

19. A method of drilling and cementing, comprising:
   drilling a wellbore with a drill string comprising a drill pipe utilizing a drilling fluid comprising water, blast furnace slag and a polyalcohol;
   circulating said drilling fluid down said drill pipe and up an annulus between said drill pipe and walls of said wellbore thus laying down a filter cake on said walls of said wellbore during said drilling, said wellbore being disposed in a formation having sufficient heat that heat is removed by said circulating of said drilling fluid;
   withdrawing said drill string and inserting a pipe, thus creating an annulus between said pipe and said walls of said borehole;
   adding additional blast furnace slag to said drilling fluid to produce a cementitious slurry; and
   displacing said cementitious slurry into at least a portion of said annulus; and
   maintaining said cementitious slurry in said at least a portion of said annulus until said heat from said formation activates said cementitious slurry to thus cause said cementitious slurry to set into a cement.

20. A method for drilling comprising
   drilling a wellbore with a drill string comprising a drill pipe utilizing a drilling fluid comprising water, blast furnace slag and a polyalcohol component; and
   circulating said drilling fluid down said drill pipe and up an annulus between said drill pipe and walls of said borehole, thus laying down a filter cake on said walls of said borehole during said drilling.

21. A method according to claim 20 wherein after said circulating of said drilling fluid said drilling fluid is displaced and a fluid containing an activator system is circulated into contact with said filter cake to set said filter cake.

22. A method according to claim 21 wherein said activator system comprises a mixture of 2 to 6 lbs/bbl of sodium hydroxide in conjunction with 7 to 21 lbs/bbl of sodium carbonate.

* * * * *